(12) United States Patent
Martin et al.

(10) Patent No.: US 9,301,217 B2
(45) Date of Patent: Mar. 29, 2016

(54) APPARATUS AND METHOD FOR NEIGHBOR RELATION REPORTING

(75) Inventors: Brian Martin, Farnham (GB); Keiichi Kubota, Weybridge (GB)

(73) Assignee: Nokia Technologies Oy, Espoo (FI)

( * ) Notice: Subject to any disclaimer, the term of this patent is extended or adjusted under 35 U.S.C. 154(b) by 32 days.

(21) Appl. No.: 13/876,501

(22) PCT Filed: Oct. 1, 2010

(86) PCT No.: PCT/IB2010/054453
§ 371 (c)(1),
(2), (4) Date: Mar. 28, 2013

(87) PCT Pub. No.: WO2012/042311
PCT Pub. Date: Apr. 5, 2012

(65) Prior Publication Data
US 2013/0183982 A1    Jul. 18, 2013

(51) Int. Cl.
*H04W 36/00*    (2009.01)
*H04W 36/34*    (2009.01)
*H04W 48/08*    (2009.01)

(52) U.S. Cl.
CPC .......... *H04W 36/0061* (2013.01); *H04W 36/34* (2013.01); *H04W 48/08* (2013.01)

(58) Field of Classification Search
USPC ...................................... 455/437, 435.1, 436
See application file for complete search history.

(56) References Cited

U.S. PATENT DOCUMENTS

| | | | |
|---|---|---|---|
| 2002/0137522 A1* | 9/2002 | Landais | H04W 36/02 455/455 |
| 2009/0286539 A1* | 11/2009 | Rangaiah | H04W 48/20 455/435.1 |
| 2012/0106370 A1* | 5/2012 | Radulescu | H04W 36/0083 370/252 |
| 2012/0142356 A1* | 6/2012 | Serravalle | H04W 36/0016 455/436 |

OTHER PUBLICATIONS

*Radio Resource Control (RRC), Protocol Specification*; 3GPP TS 25.331 V10.0.0 (Jun. 2010) Retrieved from the Internet on Apr. 30, 2013 from: <URL: http://www.3gpp.org/ftp/Specs/archive/25_series/25.331/25331-a00.zip > pp. 1-1792.
*ANR Configuration and Reporting*; 3GPP TSG-RAN WG2 Meeting #71 R2-104525 (Aug. 2010) Retrieved from the Internet on Apr. 30, 2013 from: <URL: http://www.3gpp.org/ftp/tsg_ran/WG2_RL2/TSGR2_71/Docs/R2-104525.zip > pp. 1-7.
*3rd Generation Partnership Project; Technical Specification Group Radio Access Network; User Equipment (UE) procedures in idle mode and procedures for cell reselection in connected mode*; 3GPP TS 25.304 V9.2.0 (Jun. 2010) Retrieved from the Internet on Apr. 30, 2013 from: <URL: www.quintillion.co.jp/3GPP/Specs/25304-920.pdf > pp. 1-50.

(Continued)

*Primary Examiner* — Jinsong Hu
*Assistant Examiner* — Jean Chang
(74) *Attorney, Agent, or Firm* — Alston & Bird LLP

(57) ABSTRACT

A method, apparatus and computer program product are provided to facilitate neighbor relation reporting. A method may include, while camping on a first cell, receiving an indication of detection of a second cell, causing initiation of cell reselection to the second cell, receiving system information from the second cell responsive to the initiation of cell reselection, causing termination of cell reselection, and causing provision of neighbor relation information to a network entity via the first cell.

15 Claims, 5 Drawing Sheets

(56) References Cited

OTHER PUBLICATIONS

International Search Report for Application No. PCT/IB2010/054453 dated May 23, 2011.

R2-104526; 3GPP TSG-RAN WG2 Meeting #71; ANR Measurements and Triggering, Madrid, Spain (Aug. 23-27, 2010) 5 pages.

Written Opinion for International Application No. PCT/IB2010/054453 dated May 23, 2011.

* cited by examiner

APPARATUS AND METHOD FOR NEIGHBOR RELATION REPORTING

TECHNICAL FIELD

Example embodiments of the present invention generally relate to cellular networks and, more particularly, relate to providing neighbor relation reporting.

BACKGROUND

During network configuration or other network planning exercises, a neighbor list may be defined that identifies a plurality of cells that may be capable of supporting communications between a user equipment (UE) and the network. A neighbor list may identify cells in various manners including, for example, by scrambling codes associated with the cells such as in a Code Division Multiple Access (CDMA) based network or by information regarding frequency in use by the cells in a Time Division Multiple Access (TDMA) based network. This list may be utilized, for example, to perform handover of a cell to another cell, or perform cell reselection from one serving/camped cell to another serving/camped cell.

As currently defined by $3^{rd}$ Generation Partnership Project (3GPP), handover and cell reselection procedures are limited to cells in the neighbor list even though the UE may detect one or more cells (referred to as "detected cells") that are not on the list. Traditionally, neighbor cell lists have been manually provisioned and managed. Although it may not be straight-forward to determine neighbor relationships between cells at the planning stage, later optimization of the neighbor list (e.g., determining missing or unnecessary neighbor cells) may require significant effort, especially if required for every cell of a network.

Automatic neighbor relation (ANR) has been generally proposed as a technique whereby the network may locate for a cell, one or more new neighbors that may be added to the neighbor cell list for the respective cell. But although ANR has shown promise, the technique has not yet been sufficiently developed.

BRIEF SUMMARY

A method, apparatus and computer program product are therefore provided to enable the provision of neighbor relation reporting. In some embodiments, the neighbor relation reporting may be provided in paging channel (PCH) states. Furthermore, some embodiments may provide a mechanism by which a cell reselection based solution is provided that allows neighbor relationships between different public land mobile network (PLMN) cells or even bared sells to be considered.

In one example embodiment, a method of providing neighbor relation reporting is provided. The method may include, while camping on a first cell, receiving an indication of detection of a second cell, causing initiation of cell reselection to the second cell, receiving system information from the second cell responsive to the initiation of cell reselection, causing termination of cell reselection, and causing provision of neighbor relation information to a network entity via the first cell.

In another example embodiment, a computer program product for providing neighbor relation reporting is provided. The computer program product includes at least one non-transitory computer-readable storage medium having computer-executable program code instructions stored therein. The computer-executable program code instructions may include program code instructions for, while camping on a first cell, receiving an indication of detection of a second cell, causing initiation of cell reselection to the second cell, receiving system information from the second cell responsive to the initiation of cell reselection, causing termination of cell reselection, and causing provision of neighbor relation information to a network entity via the first cell.

In another example embodiment, an apparatus for providing neighbor relation reporting is provided. The apparatus may include at least one processor and at least one memory including computer program code. The at least one memory and the computer program code may be configured to, with the at least one processor, cause the apparatus to at least perform, while camping on a first cell, receiving an indication of detection of a second cell, causing initiation of cell reselection to the second cell, receiving system information from the second cell responsive to the initiation of cell reselection, causing termination of cell reselection, and causing provision of neighbor relation information to a network entity via the first cell.

In another example embodiment, an apparatus for providing neighbor relation reporting is provided. The apparatus may include means for, while camping on a first cell, receiving an indication of detection of a second cell, means for causing initiation of cell reselection to the second cell, means for receiving system information from the second cell responsive to the initiation of cell reselection, means for causing termination of cell reselection, and means for causing provision of neighbor relation information to a network entity via the first cell.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1:
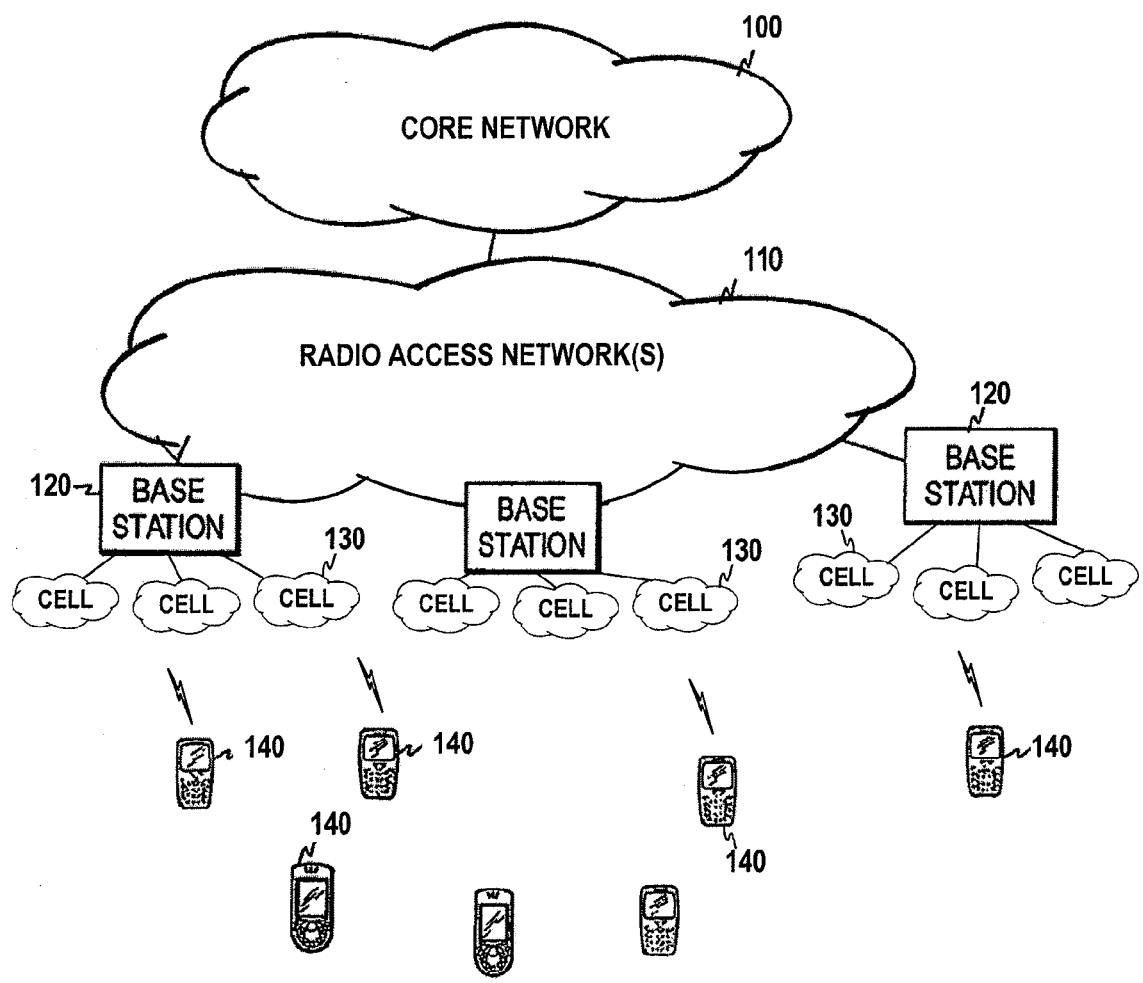
FIG. 1 illustrates a heterogeneous communication system according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Further, as described herein, various messages or other communications may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Automatic neighbor relation (ANR) is a feature by which a UE reports a new neighbor relationship to the network so that the network can maintain a neighbor cell list for that particular cell. In a typical cell reselection case, the UE can report new neighbor relations between the new serving cell and the old serving cell only when the new serving cell belongs to the selected PLMN or one of the equivalent PLMNs for the UE, and is not barred or reserved for operator use. Thus, cell reselection typically cannot provide neighbor relations between different PLMN cells or barred cells. Some embodiments of the present invention may enable the UE to perform reselection to a detected set cell and read the system information for the detected cell. The UE may then abort reselection and indicate availability of the neighbor relation information via a cell update message on the current serving cell (not the detected cell). In some embodiments, the UE may be enabled to perform the procedure described above during discontinuous reception (DRX) in PCH states. Thus, for example, the UE may not miss any paging occasions. However, in other embodiments, the UE may not care about missing paging (e.g., if the DRX period is relatively short). According to an example embodiment, if a detected cell does not belong to the selected PLMN or an equivalent PLMN, or if the detected cell is barred or reserved for operator use, the detected cell may still be considered for ANR. Example embodiments may be used to report neighbor relations of new or detected cells to a current serving cell under other conditions as well. For example, if a Cell Update or RACH access procedure fails on a new cell, the UE may be enabled to return to the original cell to report the failure. In another example, in the event of a successful reselection (and all "failure" case), the UE may be enabled to return to the original cell to perform reporting.

FIG. 1 depicts a heterogeneous communications system according to an example embodiment of the present invention. Generally, the system includes one or more public land mobile networks (PLMNs) coupled to one or more other data or communication networks—notably a wide area network (WAN) such as the Internet. As shown, each of the PLMNs includes a core network 100 backbone such as the Serving GPRS Support Node (SGSN), the Mobile Switching Centre (MSC) or the Evolved Packet Core (EPC); and each of the core networks and the Internet are coupled to one or more radio access networks 110, air interfaces or the like that implement one or more radio access technologies. As shown, the radio access networks each include one or more base stations 120 (or node B elements), access points or the like, each of which may serve a coverage area divided into one or more cells 130.

In addition, the system includes one or more mobile radio units that may be varyingly known as user equipment (UE) 140, terminal equipment, mobile station, mobile terminal or the like. As a mobile terminal, the UE may be a mobile computer, mobile telephone, a personal digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. In operation, these UEs may be configured to connect to one or more of the radio access networks 110 according to their particular radio access technologies to thereby access a particular core network of a PLMN, or to access one or more of the other data or communication networks (e.g., the Internet). In various instances, a single UE, a dual-mode or multimode UE, may support multiple (two or more) radio access networks—thereby being configured to connect to multiple radio access networks. For example, a particular UE may support both Global System for Mobile communications (GSM) and Universal Mobile Telecommunications System (UMTS) radio access technologies.

Examples of radio access technologies include 3GPP radio access, Universal Mobile Telephone System (UMTS) radio access UTRAN (Universal Terrestrial Radio Access Network), GSM radio access, CDMA 2000 radio access, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. 3GPP radio access technologies may include, for example, $3^{rd}$ generation (3G) or 3.9G (also referred to as UTRAN Long Term Evolution (LTE) or Super 3G) or E-UTRAN (Evolved UTRAN). Generally, a radio access technology may refer to any $2^{nd}$ generation (2G), 3G, $4^{th}$ generation (4G) or higher generation mobile communication technology and their different versions, as well as to any other wireless radio access technology that may be arranged to interwork with such a mobile communication technology.

Figure 2:
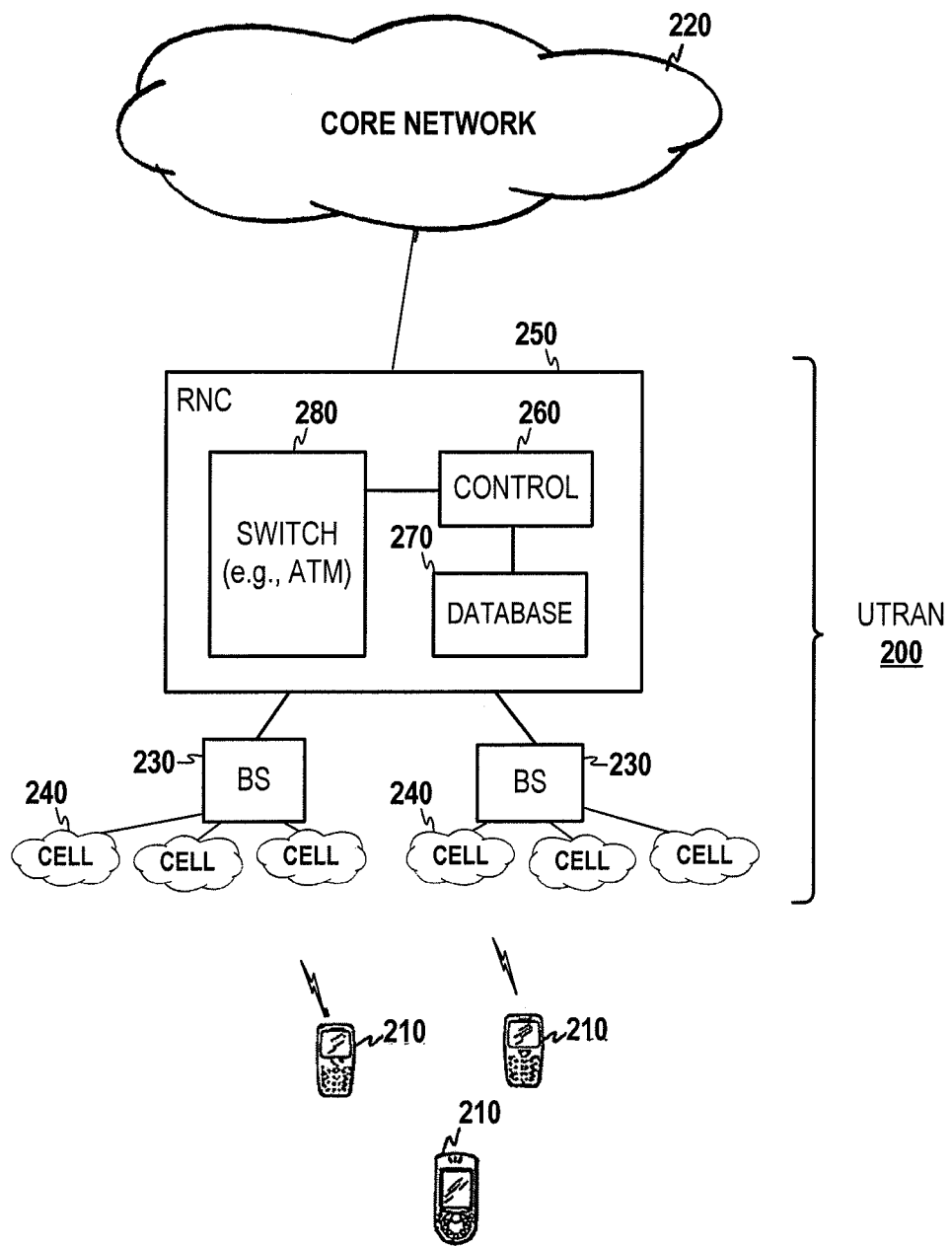
FIG. 2 illustrates a public land mobile network according to an example embodiment of the present invention.

Referring now to FIG. 2, a PLMN including a UTRAN is more particularly illustrated according to various example embodiments of the present invention. In this regard, example embodiments of the present invention may be particularly described with respect to UTRAN. More information on aspects of UTRAN may be found, for example, in 3GPP TS 25.331 v. 10.0.0 (2010-06), entitled: *Radio Resource Control (RRC): Protocol Specification (Release* 10), the content of which is incorporated by reference in its entirety. It should be understood, however, that example embodiments may be equally applicable to other radio access technologies.

The UTRAN 200, which is one of the 3rd Generation Wireless Mobile Communication Technologies, can carry many traffic types from real-time circuit switched (CS) to Internet Protocol (IP)-based packet switched (PS) traffic. The UTRAN allows connectivity between the UE 210 and the core network 220. UMTS may use wideband code division multiple access (WCDMA). The UTRAN contains the base stations (BSs) 230, called Node Bs, each of which serves a coverage area divided into cell(s) 240. In accordance with UMTS, pluralities of cells may be grouped such that each coverage area may include more than one cell. Each of these groups of cells may be referred to, for example, as a UTRAN registration area (URA). As shown, UE 210, core network 220, BS 230 and cell 240 are examples of respective ones of UE 140, core network 100, base station 120 and cell 130 of FIG. 1.

The UTRAN 200 may also include radio network controllers (RNCs) 250, each of which may provide control functionalities for one or more Node Bs. A Node B 230 and an RNC can be the same device, although typical implementations have a separate RNC located in a central office serving multiple Node Bs. Despite the fact that they do not have to be physically separated, there is a logical interface between them. The RNC and its corresponding Node Bs are called the radio network subsystem (RNS). There can be more than one RNS present in an UTRAN.

As also shown, a radio access network 110 may more generally include some type of network controlling/governing component, such as the RNC 250 in UTRAN 200, which may be responsible for control of the BSs 230 (e.g., Node Bs) that are connected to the controller. As used herein, the term "network controller" or "network controlling/governing component" may refer to any network element or a set of network elements configured to use inter-radio access technology measurements for a network decision. Such a network controlling/governing component may also include a BS or a Node-B. The network controlling/governing component may include a controller 260, processor or the like programmed to carry out radio resource management and mobility management functions, etc. The controller may be associated with a memory or database 270 for maintaining information required in the management functions. The network controlling/governing component may include a switch unit 280 (such an Asynchronous Transfer Mode (ATM) switch) for switching connection between network elements within the radio access network. The network controlling/governing component may be connected to a Circuit Switched Core Network through e.g., a Mobile Switching Center (MSC), a Media Gateway (MGW) and to e.g., a Serving General Packet Radio Service (GPRS) Support Node (SGSN) in a Packet Switched Core Network.

Figure 3:
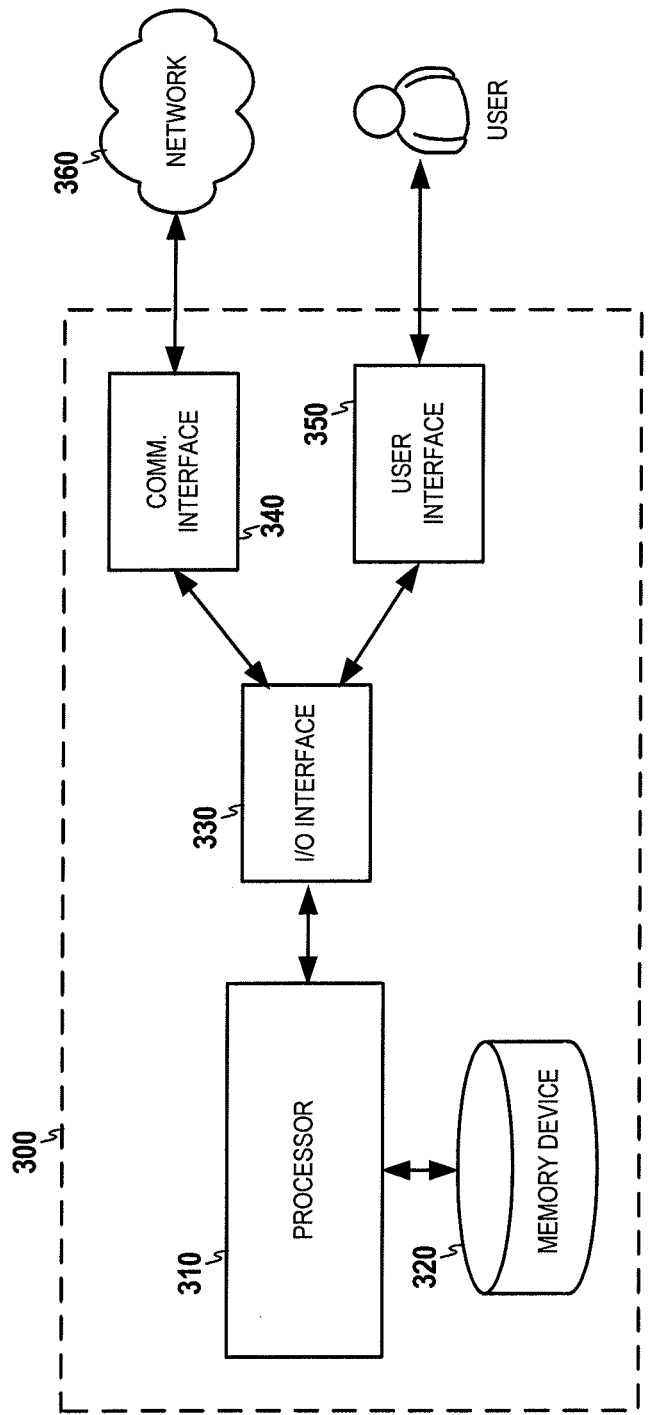
FIG. 3 illustrates an apparatus that may be configured to operate within the system of FIG. 1, according to an example embodiment of the present invention.

Reference is now made to FIG. 3, which illustrates an apparatus 300 according to example embodiments of the present invention configured to perform the various functionalities described herein. As shown and described herein, the example apparatus may be configured to function as or otherwise implement one or more of the network components depicted in FIG. 1 or 2 (e.g., BS 120, 230; UE 140, 210). The example apparatus depicted in FIG. 3 may also be configured to perform example methods of the present invention.

In some example embodiments, the apparatus 300 may be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 310, memory devices 320, Input/Output (I/O) interfaces 330, communications interfaces 340 and/or user interfaces 350 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or other like hardware devices. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 310 may be a component capable of performing operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 320 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 310.

Further, the memory device 320 may be configured to store information, data, applications, computer-readable program code instructions, and/or the like for enabling the processor 310 and the example apparatus 300 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 330 may be any device, circuitry, or means embodied in hardware, software or a combination of hardware and software that is configured to interface the processor 310 with other circuitry or devices, such as the communications interface 340 and/or the user interface 350. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 300 to perform, various functionalities of the present invention.

The communication interface 340 may be any device or means embodied in hardware, software or a combination of hardware and software that is configured to receive and/or transmit data from/to one or more networks 360 (e.g., radio access networks 110, core networks 120, 220, etc.) and/or any other device or module (e.g., other similar apparatuses) in communication with the example apparatus 300. The processor 310 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 340 may be configured to provide for communications in accordance with any of a number of wired or wireless communication standards including, for example, WCDMA. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, radio frequency (RF), infrared data association (IrDA) or any of a number of different wireless networking techniques. The communications interface may also be configured to support communications at the network layer, possibly via Internet Protocol (IP).

The user interface 350 may be in communication with the processor 310 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 320). In some example embodiments, the user interface circuitry is configured to facilitate user control of at least some functions of the apparatus 300 through the use of a display and configured to respond to user inputs. The processor may also comprise, or be in communication with, display circuitry configured to display at least a portion of a user interface, the display and the display circuitry configured to facilitate user control of at least some functions of apparatus.

Referring again to FIG. 2, in operation, the UTRAN 200 and UE 210 may be configured to operate according to a series of logical, hierarchical networking layers and sub-layers used in wireless communication. These layers may include a network layer, data layer and physical layer. The network layer (L3) generally performs network routing functions, and may include a radio resource control (RRC) sub-layer that generally handles the control signaling of the network layer between user equipment and other UTRAN components (e.g., BS 230). The RRC sub-layer may also, in one example embodiment, perform functions for connection establishment and release, broadcast of system information, radio bearer establishment, reconfiguration and releases, RRC connection mobility procedures, paging notification and release, outer loop power control or the like. As a higher network layer, the RRC sub-layer may, in one example embodiment, control or be associated with any lower network layers (e.g., the data layer). In various example embodiments, the RRC sub-layer or RRC sub-layer instantiations may create or reset any lower network layers associated with the RRC sub-layer.

The UE 210 may operate in one of two modes, namely an idle mode and a RRC connected mode. In the idle mode, the UE may select a PLMN and search for a suitable cell 240 of the respective PLMN to provide available services to the UE. The UE may select the suitable cell and tune to its control channel by a process referred to as "camping on" a cell, which cell may be referred to as a serving cell. Upon camping on a serving cell, the UE may register its presence in the URA of the serving cell. In the idle mode, the UE may perform a periodic search for higher-priority PLMNs, and upon locating such a PLMN, may select to the new PLMN and camp on a selected cell of the new PLMN—repeating the process of selecting a suitable cell in the new PLMN.

Also upon camping on a serving cell, the UE 210 is permitted to receive system information and cell broadcast (CB) messages, and monitor the paging channel (PCH) and/or paging indicator channel (PICH) of the serving cell. The system information the UE may receive from the serving cell may include a list of cells adjacent to the serving cell. This list may be controlled by the network, and is oftentimes referred to as a neighbor cell list or more simply a neighbor list. The neighbor cell list permits the UE to search for a more suitable cell in the selected PLMN based on cell reselection criteria. In this regard, at various instances, the UE may locate a cell more suitable than the serving cell. In these instances, the UE may reselect and camp on the more suitable cell. And if the new serving cell is in a different URA, the UE may update its URA registration to the URA of the new serving cell.

The UE 210 may remain in the idle mode until it transmits a request to establish a network-layer connection (e.g., RRC connection) with the UTRAN 200, such as via the random access channel (RACH) of its serving cell. This request may be initiated by the UE or may be initiated by the network according to a paging procedure. In such instances, the UE may establish a RRC connection with one or more cells 240 of a RNC 250. The respective cell(s) and RNC may be referred to respectively as serving cell(s) and serving RNC. By establishment of a RRC connection the UE may enter the RRC connected mode, and by release of the RRC connection the UE may return to the idle mode. A UE in the idle mode may therefore be characterized by a UE not connected (e.g., RRC or network-layer connection) to a UTRAN, and a UE in the connected mode may be characterized by a UE connected to a UTRAN.

In the connected mode, the UE 210 may operate in one of a number of states, namely a CELL_DCH state, CELL_FACH state, CELL_PCH state and URA_PCH state. In the CELL_DCH (dedicated channel) state, the UE has a dedicated physical channel (DPCH) with its serving cell(s) 240 of the UTRAN 200. In the CELL_DCH state, the UE may be tracked at the cell level according to a cell update procedure (CELL UPDATE) in which the UE notifies the UTRAN of its serving cell, which may occur periodically or in response to handover of the UE to a new serving cell.

In the CELL_FACH state (forward access channel—FACH), the UE 210 may monitor the FACH of its serving cell 240, but does not otherwise not have a DPCH with the respective cell. In this state, the UE may communicate with the serving cell on the respective cell's uplink common (or shared) transport channel (e.g., RACH). And similar to the CELL_DCH state, in the CELL_FACH state, the UE may be tracked at the cell level according to a cell update procedure (CELL UPDATE) in which the UE notifies the UTRAN of its serving cell, which may occur periodically or in response to cell reselection to a new serving cell (as discussed below).

In the CELL_PCH and URA_PCH (paging channel) states, the UE 210 may monitor the paging channel (PCH) and/or paging indicator channel (PICH) of its serving cell 240. Similar to the CELL_FACH state, the UE in the CELL_PCH and URA_PCH states may not have a DPCH with the serving cell; but in the CELL_PCH and URA_PCH states, the UE may also not be assigned an uplink transport channel of the serving cell. In the CELL_PCH state, the UE may be tracked at the cell level; and in the URA_PCH state, the UE may be tracked at the URA level.

A UE 210 in the CELL_FACH, CELL_PCH and URA_PCH states may perform a cell reselection process similar to that performed by the UE in the idle mode. In this regard, a UE in one of these connected states may receive a neighbor cell list from its serving cell 240 and use the list to search for a more suitable cell based on cell reselection criteria. In instances in which the UE locates a more suitable cell, the UE may reselect and be connected to the more suitable cell; and if the new serving cell is in a different URA, the UE may update its URA registration to the URA of the new serving cell.

The UE 210 may enter the CELL_DCH state from the idle mode upon establishment of a connection with a UTRAN 200 and setting up a dedicated physical channel (DPCH) with its serving cell 240, and return to the idle mode (or enter the idle mode from the CELL_DCH state) upon release of the connection. The UE may also enter the CELL_DCH state from the CELL_FACH state upon setting up a dedicated physical channel (DPCH) with the serving cell; and the UE may return to the CELL_FACH state (or enter the CELL_FACH state from the CELL_DCH state) upon release of the DPCH. The UE may enter the CELL_FACH state from the idle mode upon establishment of a connection with a UTRAN in which a DPCH is not set up, and may return to the idle mode (or enter the idle mode from the CELL_FACH state) upon release of the connection. The UE may also enter the CELL_FACH state from either of the CELL_PCH or URA_PCH states in the connected mode, such as when the UE desires to send signaling or user data; and the UE may return to the respective CELL_PCH or URA_PCH state (or enter the CELL_PCH or URA_PCH state from the CELL_FACH state) in response to a lack of activity.

Similar to the UE 210 in the idle mode receiving a neighbor cell list from its serving cell, the UE in the connected mode may similarly receive a neighbor cell list from cell 240 to which the UE is connected. This list may also be controlled by the network. The list may be utilized to perform handover procedures, such as when the UE is in the CELL_DCH state. The list may also be used to perform cell reselection, such as when the UE is in the CELL_FACH state, CELL_PCH state or URA_PCH state.

As currently defined by 3GPP, handover and cell reselection procedures are limited to cells in the neighbor cell list even though the UE 210 may detect one or more cells (referred to as "detected cells") that are not on the list. Traditionally, neighbor cell lists have been manually provisioned and managed. Automatic neighbor relation (ANR) is generally a technique whereby the network may locate for a cell, one or more new neighbors that may be added to the neighbor cell list for the respective cell. However, as indicated above, a detected cell may not be reportable if the detected cell does not belong to the selected PLMN (or an equivalent PLMN) and is not barred or reserved for operator use. An example embodiment may alter this situation by enabling the provision of neighbor relation information for even different PLMN cells or barred cells.

According to an example embodiment, the UE 210 may be configured (e.g., by execution (by the processor 310) of instructions (stored in memory device 320)) to perform the operations described below. Thus, for example, the UE may be configured to initially detect a cell that is not included in the neighbor cell list given by the current serving cell and thereafter initiate a cell reselection procedure if cell reselection criteria apart from PLMN validity are met. As part of the cell reselection procedure, the UE may read the system information of the detected cell and check as to whether the PLMN broadcasted in the system information is either the selected PLMN or an equivalent PLMN. If the PLMN broadcasted on the detected cell is not either the selected PLMN or an equivalent PLMN, the UE may abort the cell resection procedure and stay in the current serving cell. The UE may then initiate a cell update procedure and send a cell update message with neighbor relation information during the cell update procedure. However, if the PLMN is part of the selected PLMN or an equivalent PLMN, the UE may further check access restrictions associated with the cell to see if the cell is barred or reserved. If the cell is barred or reserved, the UE may abort cell reselection as indicated above and stay in the current serving cell. The UE may then initiate the cell update procedure after aborting the cell reselection and send a cell update message with the neighbor relation information during the cell update procedure.

Thus, according to some example embodiments, the UE 210 may be configured to report neighbor relation information between different PLMN cells or even cells that are access restricted (e.g., barred or reserved). Other failure cases may also be reported in some embodiments. Since system information reading occurs during DRX in PCH states, there may be no disruption of service and no missed paging experienced when some example embodiments are practiced unlike system information reading that might occur CELL_DCH solutions that may result in gaps in service reception. In cases in which the UE reports to the current serving cell, the UE may not need to register on the new cell and the network may not need to transfer context information from an old location to a new location even in successful cases. Updating on the current cell (and not the new cell) according to some embodiments may also provide an advantage of enabling the network to unambiguously determine the source so that reporting cells that would otherwise not be successfully reselected can be accomplished.

Figure 4:
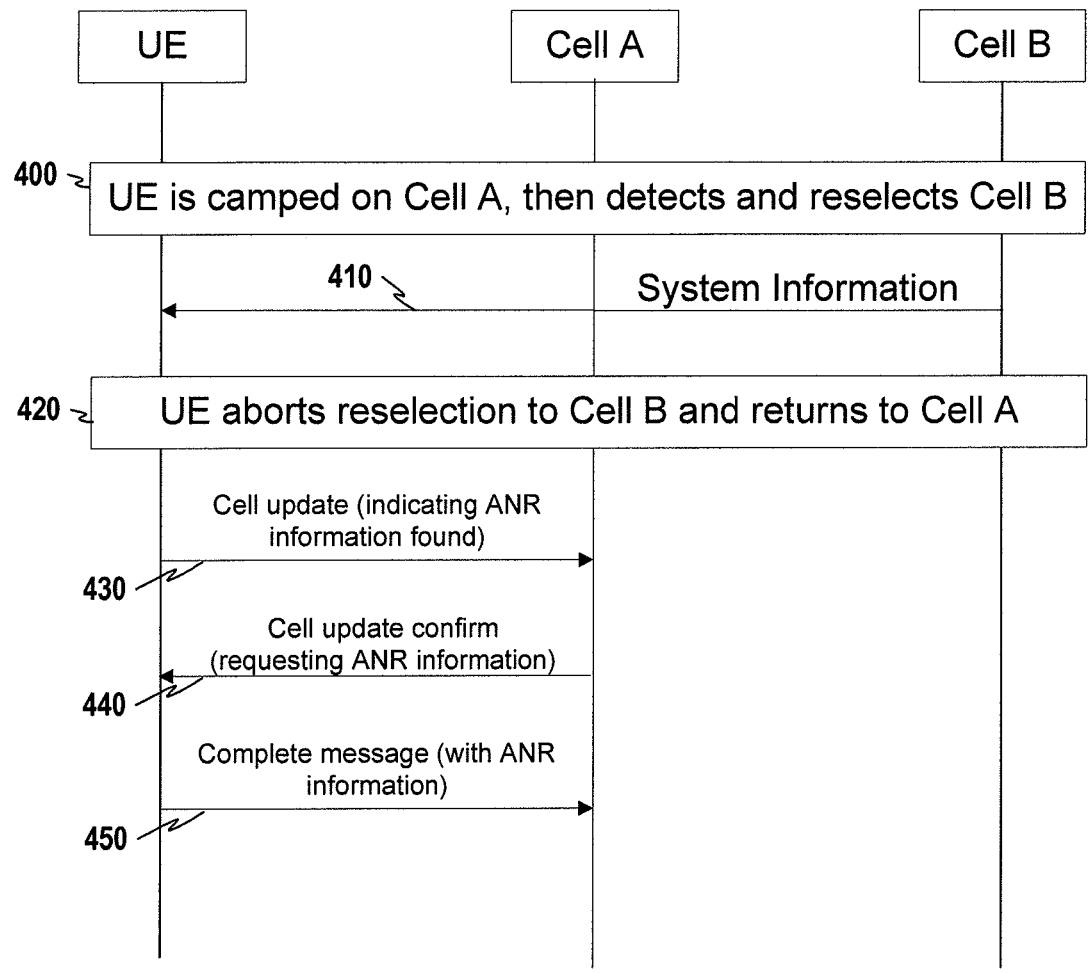
FIG. 4 illustrates a control flow diagram to show some of the example operations that may be performed in an example embodiment.

Reference is made to FIG. 4, which presents a flowchart illustrating various operations that may be performed by a first apparatus and second apparatus according to an example embodiment of the present invention. The first apparatus of these example embodiments may be embodied by or otherwise associated with a UE 140, 210, and the second apparatus of these example embodiments may be a component of a radio access network, such as a BS 120, 230 or network controlling/governing component (e.g., RNC 250). As shown in FIG. 3, each apparatus may include means, such as the processor 310, communication interface 340 (e.g., transmitter, antenna, etc.) or the like. However, in some embodiments, either or both of the apparatuses may be embodied as a chip or chip set. In other words, each apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. Each apparatus may therefore, in some cases, be configured to implement an embodiment of the present invention on a single chip or as a single "system on a chip." As such, in some cases, a chip or chipset may constitute means for performing one or more operations for providing the functionalities described herein.

FIG. 4 illustrates a control flow diagram to show some of the example operations that may be performed in an example embodiment. As shown in FIG. 4, the UE may initially be camped on Cell A, and may then detect and reselect Cell B at operation 400. At operation 410, Cell B may send its system information to the UE. The UE may then abort reselection to Cell B and return to Cell A at operation 420. As indicated above, the aborting of the cell reselection to Cell B may be accomplished responsive to a determination that Cell B is an access restricted cell or a cell associated with a different PLMN than a currently selected PLMN. At operation 430, the UE may send a message to Cell A initiating a cell update. The message sent may indicate that ANR information has been found for a detected cell (e.g., for Cell B). Responsive to the message received, Cell A may send a cell update confirmation requesting the ANR information at operation 440. The UE may then send a message including the ANR information to Cell A so that Cell A can update the neighbor list to include Cell B at operation 450.

Figure 5:
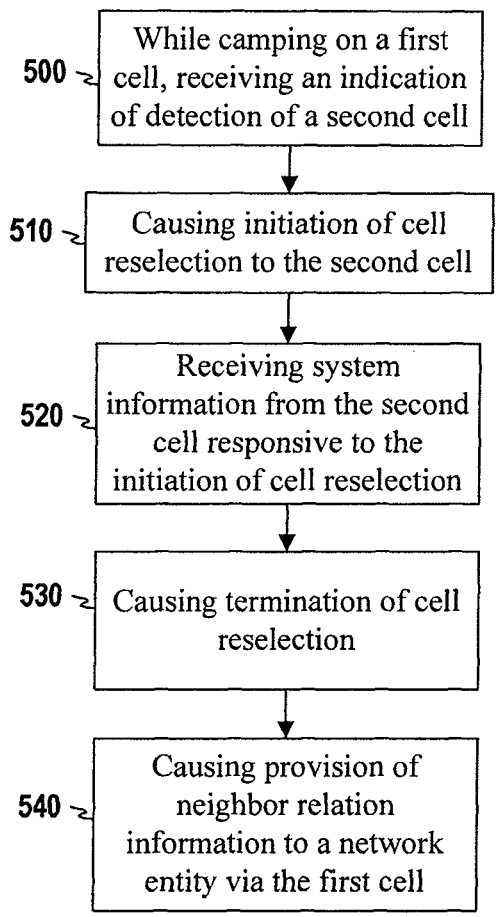
FIG. 5 is a flowchart illustrating various operations of a method of neighbor relation reporting according to an example embodiment of the present invention.

FIG. 5 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or other device and executed by a processor in the mobile terminal or other device. As will be appreciated, any such computer program instructions may be loaded onto a computer or other programmable apparatus, e.g., hardware, to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include while camping on a first cell, receiving an indication of detection of a second cell at operation 500 and causing initiation of cell reselection to the second cell at operation 510. The method may further include receiving system information from the second cell responsive to the initiation of cell reselection at operation 520, causing termination of cell reselection at operation 530, and causing provision of neighbor relation information (e.g., generated based on the system information) to a network entity via the first cell at operation 540.

In some embodiments, certain ones of the operations above may be modified or further amplified as described below. Moreover, in some embodiments additional optional operations may also be included. It should be appreciated that each of the modifications, optional additions or amplifications described herein may be included with operations 500 to 540 above either alone or in combination with any others among the features described herein. As such, each of the optional modifications is combinable with operations 500, 510, 520, 530 and 540 either alone or with one, more than one, or all of the other optional operations in any combination. In an example embodiment, causing provision of the system information may include initiating a cell update procedure. In some embodiments, causing provision of the system information may include initiating the cell update procedure to inform the network entity that the system information is available and providing the system information to the network entity responsive to receipt of confirmation of the cell update procedure from the network entity. In an example embodiment, receiving the system information may include receiving the system information during discontinuous reception (DRX) in a paging channel (PCH) state. In some examples, causing termination of cell reselection comprises causing termination of cell reselection responsive to a determination that the second cell is access restricted or is associated with a different network than a currently selected network.

In an example embodiment, an apparatus for performing the method of FIG. 5 above may comprise a processor (e.g., the processor 310) configured to perform some or each of the operations (500-540) described above. The processor may, for example, be configured to perform the operations (500-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-540 may comprise the processor and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although described above in conjunction with UTRAN, the method, apparatus and computer program product of other example embodiments may be employed in conjunction with other types of networks. Additionally, the method, apparatus and computer program product of an example embodiment of the present invention may be utilizing in conjunction with various types of reselections including intra-frequency, inter-frequency and inter-radio access technology (inter-RAT) reselections. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    while camping on a first cell associated with a currently selected network, receiving an indication of detection of a second cell associated with a different network than the currently selected network;
    causing initiation of cell reselection to the second cell;
    receiving system information from the second cell responsive to the initiation of cell reselection;
    causing termination of cell reselection; and
    causing provision of neighbor relation information associated with the second cell to a network entity via the first cell, wherein causing provision of the neighbor relation information further comprises initiating the cell update procedure to inform the network entity that the neighbor relation information is available and providing the neighbor relation information to the network entity responsive to receipt of confirmation of the cell update procedure from the network entity.

2. The method of claim 1, wherein causing provision of the neighbor relation information comprises initiating a cell update procedure.

3. The method of claim 1, wherein receiving the system information comprises receiving the system information during discontinuous reception (DRX) in a paging channel (PCH) state.

4. The method of claim 1, wherein causing termination of cell reselection comprises causing termination of cell reselection responsive to a determination that the second cell is access restricted.

5. The method of claim 1, wherein causing termination of cell reselection comprises causing termination of cell reselection responsive to a determination that the second cell is associated with a different network than a currently selected network.

6. An apparatus comprising at least one processor and at least one memory including computer program code, the at least one memory and the computer program code configured to, with the at least one processor, cause the apparatus to at least:
    while camping on a first cell associated with a currently selected network, receive an indication of detection of a second cell associated with a different network than the currently selected network;
    cause initiation of cell reselection to the second cell;
    receive system information from the second cell responsive to the initiation of cell reselection;
    cause termination of cell reselection; and cause provision of neighbor relation information associated with the second cell to a network entity via the first cell,
    wherein the at least one memory and computer program code are further configured to, with the at least one processor, cause the apparatus to cause provision of the neighbor relation information by initiating the cell update procedure to inform the network entity that the neighbor relation information is available and providing the neighbor relation information to the network entity responsive to receipt of confirmation of the cell update procedure from the network entity.

7. The apparatus of claim 6, wherein the at least one memory and computer program code are further configured to, with the at least one processor, cause the apparatus to cause provision of the neighbor relation information by initiating a cell update procedure.

8. The apparatus of claim 6, wherein the at least one memory and computer program code are further configured to, with the at least one processor, cause the apparatus to receive the system information by receiving the system information during discontinuous reception (DRX) in a paging channel (PCH) state.

9. The apparatus of claim 6, wherein the at least one memory and computer program code are further configured to, with the at least one processor, cause the apparatus to cause termination of cell reselection by causing termination of cell reselection responsive to a determination that the second cell is access restricted.

10. The apparatus of claim 6, wherein the at least one memory and computer program code are further configured to, with the at least one processor, cause the apparatus to cause termination of cell reselection by causing termination of cell reselection responsive to a determination that the second cell is associated with a different network than a currently selected network.

11. A computer program product comprising at least one non-transitory computer-readable storage medium having computer-executable program code instructions stored therein, the computer-executable program code instructions comprising program code instructions to:
  while camping on a first cell associated with a currently selected network, receive an indication of detection of a second cell associated with a different network than the currently selected network;
  cause initiation of cell reselection to the second cell;
  receive system information from the second cell responsive to the initiation of cell reselection;
  cause termination of cell reselection; and cause provision of neighbor relation information associated with the second cell to a network entity via the first cell,
  wherein program code instructions for causing provision of the neighbor relation information further include instructions for initiating the cell update procedure to inform the network entity that the neighbor relation information is available and providing the neighbor relation information to the network entity responsive to receipt of confirmation of the cell update procedure from the network entity.

12. The computer program product of claim 11, wherein program code instructions for causing provision of the neighbor relation information include instructions for initiating a cell update procedure.

13. The computer program product of claim 11, wherein program code instructions for receiving the system information include instructions for receiving the system information during discontinuous reception (DRX) in a paging channel (PCH) state.

14. The computer program product of claim 11, wherein program code instructions for causing termination of cell reselection include instructions for causing termination of cell reselection responsive to a determination that the second cell is access restricted.

15. The computer program product of claim 11, wherein program code instructions for causing termination of cell reselection include instructions for causing termination of cell reselection responsive to a determination that the second cell is associated with a different network than a currently selected network.

* * * * *